United States Patent [19]

Ando et al.

[11] Patent Number: 5,368,531
[45] Date of Patent: Nov. 29, 1994

[54] CONTROL METHOD OF AND SYSTEM THEREOF FOR INVERSELY PROPORTIONALLY RAISING AND LOWERING SERVO HYDRAULIC PRESSURE, BASED ON INPUT TORQUE, FOR ENGAGING AND DISENGAGING FRICTIONAL ELEMENTS IN AUTOMATIC TRANSMISSION

[75] Inventors: Masahiko Ando, Okazaki; Koji Noda, Anjo; Yoshihisa Yamamoto, Nishio; Masahiro Hayabuchi, Anjo; Kazumasa Tsukamoto, Toyota; Yasuo Hojo, Nagoya; Seitoku Kubo, Toyota; Yutaka Taga; Hidehiro Oba, both of Aichi, all of Japan

[73] Assignees: Aisin Aw Co., Ltd.; Jidosha Kabushiki Kaisha Toyota, both of Japan

[21] Appl. No.: 982,677

[22] Filed: Nov. 27, 1992

[30] Foreign Application Priority Data

Dec. 3, 1991 [JP] Japan .................. 3-344124

[51] Int. Cl.⁵ .............................................. F16H 5/40
[52] U.S. Cl. ............................... 477/155; 477/143; 477/131
[58] Field of Search ................... 74/862, 867, 868; 477/127, 131, 143, 150, 154, 155

[56] References Cited

U.S. PATENT DOCUMENTS

| | | | |
|---|---|---|---|
| 4,188,839 | 2/1980 | Kubo et al. | 74/869 |
| 4,713,989 | 12/1987 | Hayakawa et al. | 74/867 X |
| 4,722,247 | 2/1988 | Shindo et al. | 74/867 X |
| 4,724,723 | 2/1988 | Lockhart et al. | 74/851 |
| 4,942,787 | 7/1990 | Aoki et al. | 74/867 |
| 5,046,176 | 9/1991 | Lin | 364/424.1 |
| 5,046,383 | 9/1991 | Butts et al. | 74/862 |
| 5,079,970 | 1/1992 | Butts et al. | 74/867 X |
| 5,154,099 | 10/1992 | Asatsuke et al. | 74/867 |

FOREIGN PATENT DOCUMENTS

| | | |
|---|---|---|
| 0411558 | 7/1990 | European Pat. Off. |
| 2938268 | 9/1979 | Germany |
| 3140259 | 10/1981 | Germany |
| 48-72562 | 9/1973 | Japan |
| 54-109569 | 8/1979 | Japan |
| 6465354 | 3/1989 | Japan |
| 12245539 | 9/1989 | Japan |

*Primary Examiner*—Dirk Wright
*Assistant Examiner*—Khoi Q. Ta
*Attorney, Agent, or Firm*—Lorusso & Loud

[57] ABSTRACT

A method is provided for the control of servo hydraulic pressure in an automatic transmission. Servo hydraulic pressure is adapted to engage or release first and second frictional engagement elements arranged in such a relationship that, upon shifting from one particular speed stage to another, one of the first and second frictional engagement elements is released while the other is engaged. The servo hydraulic pressure, engaging one frictional engagement element, is linearly lowered in a torque phase during a shift so it releases the one frictional engagement element, responsive to a rise in the servo hydraulic pressure to the frictional engagement element to be engaged, to maintain an inversely proportional relationship between the servo hydraulic pressure being raised and that being released.

6 Claims, 4 Drawing Sheets

CONTROL METHOD OF AND SYSTEM THEREOF FOR INVERSELY PROPORTIONALLY RAISING AND LOWERING SERVO HYDRAULIC PRESSURE, BASED ON INPUT TORQUE, FOR ENGAGING AND DISENGAGING FRICTIONAL ELEMENTS IN AUTOMATIC TRANSMISSION

BACKGROUND OF THE INVENTION

1) Field of the Invention

This invention relates to a control method for an automatic transmission, especially to a method for the control of servo hydraulic pressure adapted to have frictional engagement elements engaged or released for changing the gear position of an automatic transmission.

2) Description of the Related Art

An automatic transmission mounted on a vehicle is designed to provide a multiplicity of speed stages with a view toward improving the running performance, gas mileage, riding comfort and the like to the vehicle. However, increases in dimensions and weight which result from the provision of such a multiplicity of speed stages impair the mountability of the automatic transmission on the vehicle and reduce the gas mileage. To provide automatic transmissions with a multiplicity of speed stages, there is therefore a need for further dimensional and weight reduction and also for further structural simplification. In view of the foregoing, the assignee of the present application has already developed a five-speed automatic transmission in which an inlet-side overdrive planetary gear is combined with a 4-forward/1-reverse primary shifting unit composed of an in-line train of three planetary gears. The gear train of the primary shifting unit, however, requires engagement of friction elements of different brakes upon shifting from a 2nd speed to a 3rd speed. This engagement tends to produce a shift shock. In a method commonly employed to avoid such a shift shock, a one-way clutch is inserted in series with frictional engagement elements which take part in the engagement. Addition of such a structural element is however contradictory with the above-described objective of dimensional and weight reduction. It is desirable to avoid the addition of such a structural element if another measure is available.

Conventional methods of controlling servo pressure, which involve engagement of different frictional engagement elements as described above, include the use of a timing valve. In these conventional methods, the timing valve is actuated when the servo pressure of servo means, adapted to operate a friction element on an engaging side, has reached a predetermined level or higher. A large-diameter orifice is then opened to promptly drain the servo pressure on the releasing side. This makes it possible to control the timings of the engagement and release. Further, as is disclosed in Japanese Patent Application Laid-Open No. SHO 64-65354, both throttle pressure and engaging pressure are applied in a mutually opposing relation against a valve spool so that the change-over of an the orifice for controlling drain pressure is performed at a timing corresponding to the engine load.

In the former technique, the timing valve is designed to change over against spring load at a predetermined constant pressure. The pressure employed to operate the timing valve is throttle pressure which also controls the line pressure and the engaging pressure. Good change-over performance cannot therefore be achieved under certain shift conditions. A shift shock occurs due to tie-up of a brake especially when the accelerator pedal is released in the course of a shift and the input torque is changed accordingly. Since the timing of change-over of a timing valve is determined by the initial setting, it is impossible to make a correction against a deviation in the coefficient of friction of a friction element, time-dependent reduction of engine torque, or the like. Further, it is also impossible to cope with variations in temperature or a change in throttle opening during a shift because the control of the change-over timing is effected by switching drain orifices. No matter which conventional technique is used, it is extremely difficult to restore drain pressure once drainage is started. This makes it impossible to promptly correct the timing of change-over responsive to variations in the input torque.

SUMMARY OF THE INVENTION

With the foregoing in view, the present invention has a primary object the provision of a method for controlling servo hydraulic pressure, which method regulates both engaging pressure and drain pressure in a mutually dependent manner during a shift, thereby making it possible to properly correct the timings of engagement and release even at extremely low temperatures or immediately responsive to a change in the throttle opening, even during the shift, and therefore inhibiting or reducing a shift shock.

To overcome the above problems, the present invention therefore provides a method for the control of servo hydraulic pressure in an automatic transmission provided with planetary gear mechanisms disposed between an input shaft and an output shaft so that shifting elements of the planetary gear mechanisms can be connected under control of servo hydraulic pressure to establish a different power flow in accordance with engagement or release of frictional engagement elements and hence to achieve plural speed stages.

The method of the present invention includes linearly lowering servo hydraulic pressure, which is adapted to engage or release first and second frictional engagement elements arranged in such a relationship that upon shifting from a particular speed stage to another among the plural speed stages, one of said first and second frictional engagement elements is released while the other is engaged, in a torque phase during a shift so that the servo hydraulic pressure on a side of the frictional engagement element to be released by using as an input the servo hydraulic pressure on a side of the frictional engagement element to be engaged is maintained in conformity with an inversely proportional relationship between engaging pressure and drain pressure.

According to the servo hydraulic pressure control system of the present invention, designed as described above, the drain pressure is lowered relative to the engaging pressure throughout the period of a shift so that the drain pressure is maintained in an inversely proportional relationship with the engaging pressure. The drain pressure is therefore always maintained at a proper value. This makes it possible to achieve control such that the servo hydraulic pressure an be promptly corrected responsive to any temperature change and to any change in throttle opening in the course of the shift. Appropriate timing is therefore always available for a shift by controlling the servo hydraulic pressure alone. Shift shocks can therefore be reduced without using any one-way clutch.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENT

Figure 3:
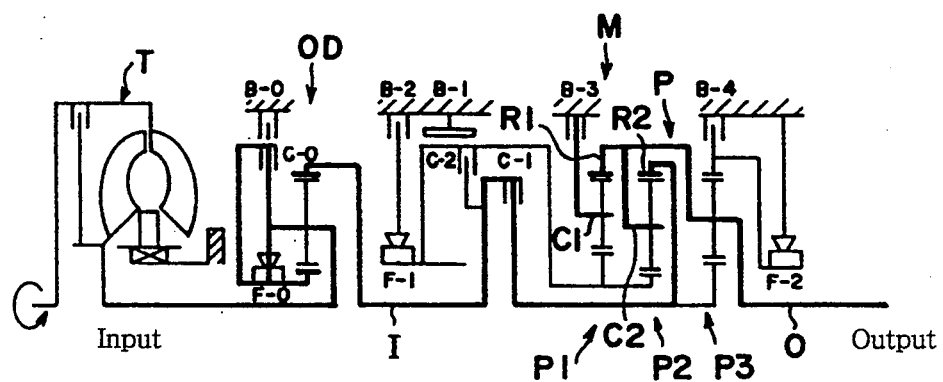
FIG. 3 is a skeleton diagram showing a gear train of the automatic transmission, said gear train being at a 2nd speed position.

One embodiment of a system useful in the practice of the method of this invention will hereinafter be described with reference to the accompanying drawings. In the illustrated embodiment, the automatic transmission is, as shown in FIG. 3, a five-speed automatic transmission in which an inlet-side overdrive planetary gear OD is combined with a 4-forward/1-reverse primary shifting unit M composed of an in-line train of three planetary gears. The brakes which are alternatively engaged upon shifting are a brake B-3 and a brake B-2, the former brake being engaged only in a 2nd speed and the latter only in a 3rd speed. The automatic transmission includes, as is conventional, an inlet-side overdrive planetary gear OD and a primary shifting unit M, in addition to a torque converter T equipped with a lockup clutch. Planetary gear mechanism P is equipped with an in-line train of three sets of planetary gears P1, P2, P3 with individual shifting elements being connected directly as needed. Arranged in association with the shifting elements (sun gears, carriers, ring gears) of the individual planetary gears, are clutches C-1, C-2, brakes B-1 to B-4 and one-way clutches F-1, F-2. Although not shown in the drawing, the clutches and brakes are each provided, as in the conventional art, with a servo means which comprises a piston-cylinder mechanism to engage or release a frictional engagement element of the corresponding clutch or brake under control by servo pressure.

Figure 4:
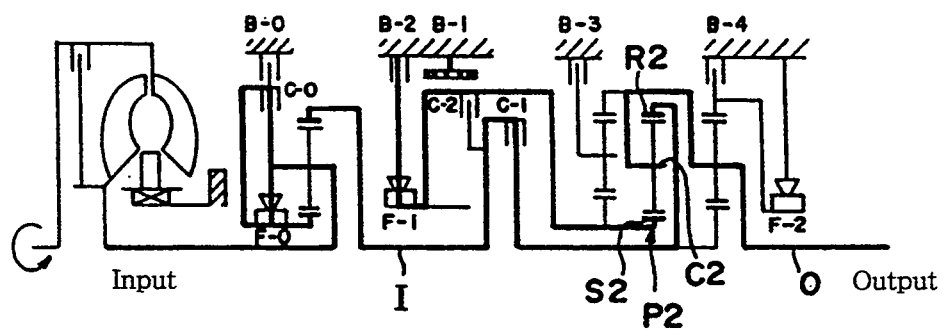
FIG. 4 is a skeleton diagram showing the gear train of the automatic transmission, said gear train being at a 3rd speed position.

In the gear position illustrated in FIG. 3, in which the clutch C-1 and the brake B-3 are both engaged and the remaining frictional engagement elements are all released, rotation of the output shaft I, which also serves as an output shaft of the input-side overdrive planetary gear OD, is transmitted as 2nd speed rotation at the output shaft O. A ring gear R2 of the planetary gear P2 serves as an input element, carrier C1 of the planetary gear P1 functions as a reaction force element, and both carrier C2 of the planetary gear P2 and ring gear R1 of the planetary gear P1, said ring gear R1 being connected directly with said carrier C2, serve as output elements. In the gear position depicted in FIG. 4, in which the clutch C-1 remains engaged, the brake B-2 is engaged and the remaining frictional engagement elements are all released, rotation of the output shaft I is transmitted as 3rd speed rotation at the output shaft O, with the ring gear R2, a sun gear S2 and the carrier C2 of the planetary gear P2 serving as an input element, a reaction force element and an output element, respectively. Accordingly, the frictional engagement elements which take part in the 2→3 shift are the brake B-3 and the brake B-2.

Figure 1:
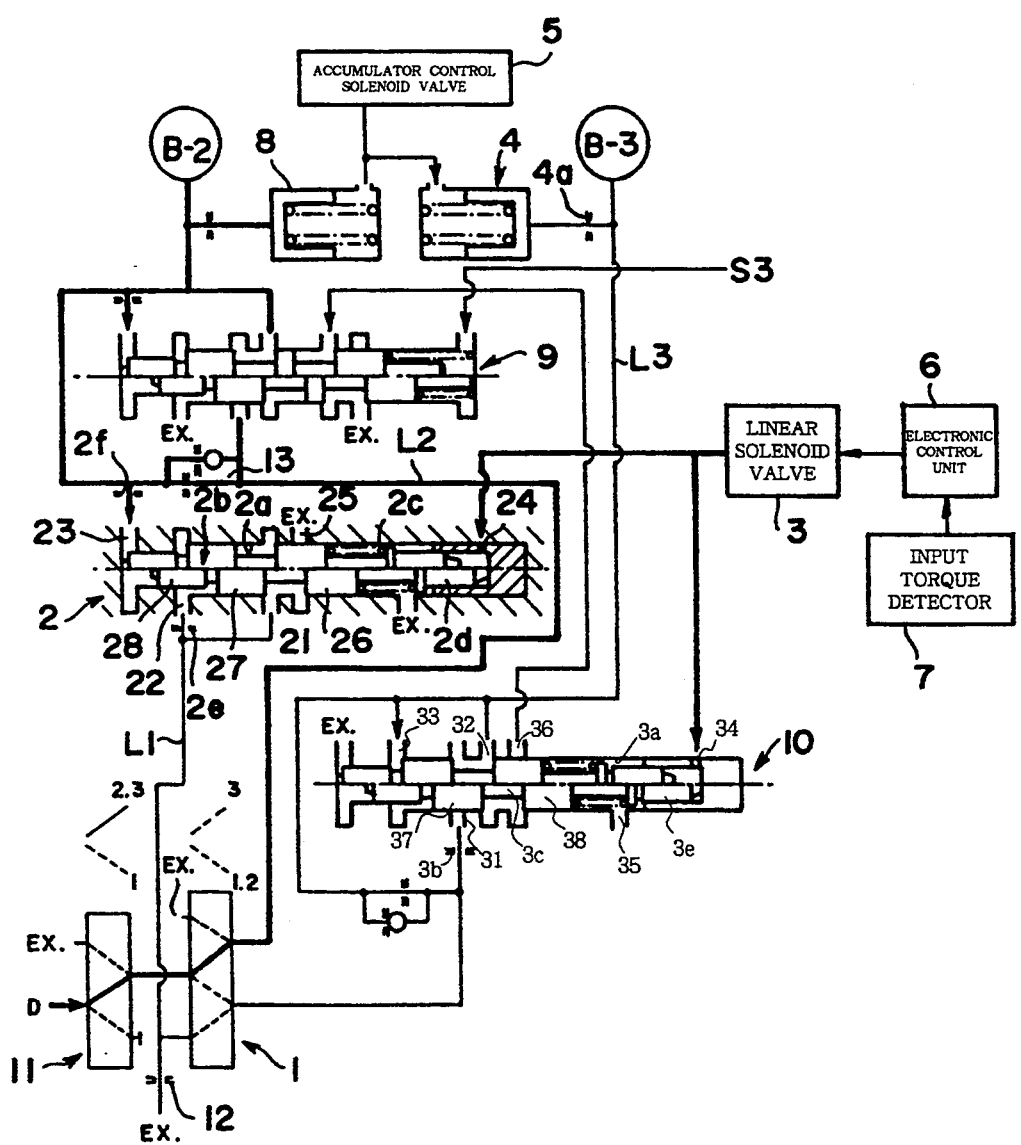
FIG. 1 is a fragmentary diagram of a hydraulic control circuit of an automatic transmission which can be used to practice a servo hydraulic pressure control method according to one embodiment of the present invention.

The hydraulic pressure control system of the automatic transmission is provided with means for regulating the servo pressure for servo mechanism which are adapted to engage or release the frictional engagement elements of the brake B-3 and brake B-2 in such a way that, upon shifting, one of the brakes is released and the other is engaged. This pressure regulating means includes as illustrated in FIG. 1, a 2–3 shift valve 1, a 2–3 timing valve 2, an SLU linear solenoid valve 3, a B-3 accumulator 4, and an accumulator control solenoid valve 5 for controlling the back pressure of the B-3 accumulator 4. In addition, there are also provided an electronic control unit (ECU) 6 for outputting a control signal to the SLU linear solenoid valve 3 in accordance with engine load and an input torque detector 7 for detecting input torque and for generating an input torque signal in accordance with the detected engine load. The ECU 6 outputs the control signal responsive to said input torque signal.

Describing the construction of each element in further detail, formed in a cylinder wall defining a valve bore 2a of the 2-3 timing valve 2 are a port 21 in communication with a drain line L1 of the 2-3 shift valve 1, a drain pressure input port 22 communication with the line L1 via an orifice 2e, a feed pressure input port 23 communicating via an orifice 2f with a feed line L2 extending from the 2-3 shift valve 1 to the B-2 brake servo means, an input torque signal port 24 fed with a signal hydraulic pressure regulated by the SLU linear solenoid valve 3 which is controlled by a control signal from the ECU 6 in accordance with a signal corresponding to input torque, and a drain port 25. A spool 2f fitted inside the valve bore 2a is provided with a land 26, another land 27 and a small-diameter land 28. The land 26 is located at one end of the spool 2b and serves to control the opening of the drain port 25. The land 27 is located at an axial intermediate portion of the spool 2b, divides the drain pressure input port 22 and the port 21 from each other, and forms a pressure-receiving face for drain pressure on the side of the drain pressure input port 22. The small-diameter land 28, on the other hand, divides the feed pressure input port 23 and the drain pressure input port 22 from each other. The land 26 located on the one end of the spool 2b is in contact with a pressure-receiving piston 2d via a spring 2c. The pressure-receiving piston 2d forms a pressure-receiving face for signal pressure from the input torque signal port 24.

The B-3 accumulator 4 is connected via an orifice 4a to a feed line L3 which extends to the B-3 servo means so that, like the B-2 accumulator 8 for the B-2 servo means, the drain pressure of the feed line L3 can be regulated under the control of back pressure even during drainage. In the drawing, numeral 9 designates a B-2 orifice control valve which constitutes a fast filling means. This fast filling means accelerates feeding of hydraulic pressure to the B-2 servo means at an initial stage of the feeding. Designated at numeral 10 is a B-3 control valve which takes a part in a shift from the 2nd speed to the 3rd shift. The B-3 control valve serves to lock the spool 2b in a leftward position indicated by its the upper half portion illustrated in the drawing.

In the servo hydraulic control system constructed as described above, when operated at the 2nd gear position, drive range pressure which has been fed through a manual valve (not shown) is fed to the B-3 servo means via a 1-2 shift valve 11, the 2-3 shift valve 1 and the feed line L3. The brake B-3 is therefore in the engaged state. When a shifting solenoid valve (not shown) is actuated responsive to a control signal from ECU 6 in accordance with the running conditions of the vehicle and the 2-3 shift valve 1 is changed over to the 3rd position (the intravalve oil passage is shown by solid lines), the hydraulic pressure of the B-3 servo means begins to flow from the feed line L3 to the drain line L1 via the 2-3 shift valve 1, and further into the drain pressure input port 22 via the port 21 and orifice 2e while a portion thereof is drained through an orifice 12 having a very small diameter and serving to prevent valve sticking.

On the other hand, the drive range pressure is fed from the 2-3 shift valve 1 to the B-2 servo means via the feed line L2. At this time, the B-2 orifice control valve 9 is switched under spring force to the position indicated by its upper half portion shown in the drawing. The drive range pressure is therefore promptly fed to the B-2 servo means through the large capacity intravalve oil passage which extends through the valve 9 while bypassing a checkball-fitted orifice 13. As a consequence, a piston of the B-2 servo means is promptly moved until it engages the associated frictional engagement element, whereby any play is eliminated. At the time of completion of this fast filling operation, the valve 9 is displaced to the position which is indicated by its lower half portion shown in the drawing, by feedback of the hydraulic pressure (hereinafter called "the B-2 pressure") from the feed line L2. By slowly feeding hydraulic pressure through the checkball-fitted orifice 13, the B-2 pressure begins to rise gradually so that pressure is accumulated in the accumulator 8. As a result of an increase in pressure at the input port 23 of the 2-3 timing valve 2, the spool 2b is displaced rightwards as indicated by its lower half portion in the drawing so that the drain port 25 is opened. As a consequence, the pressure (hereinafter called "the B-3 pressure") of the drain line (namely, the feed line L3) is lowered in accordance with the increase in pressure at the port 23.

Figure 2:
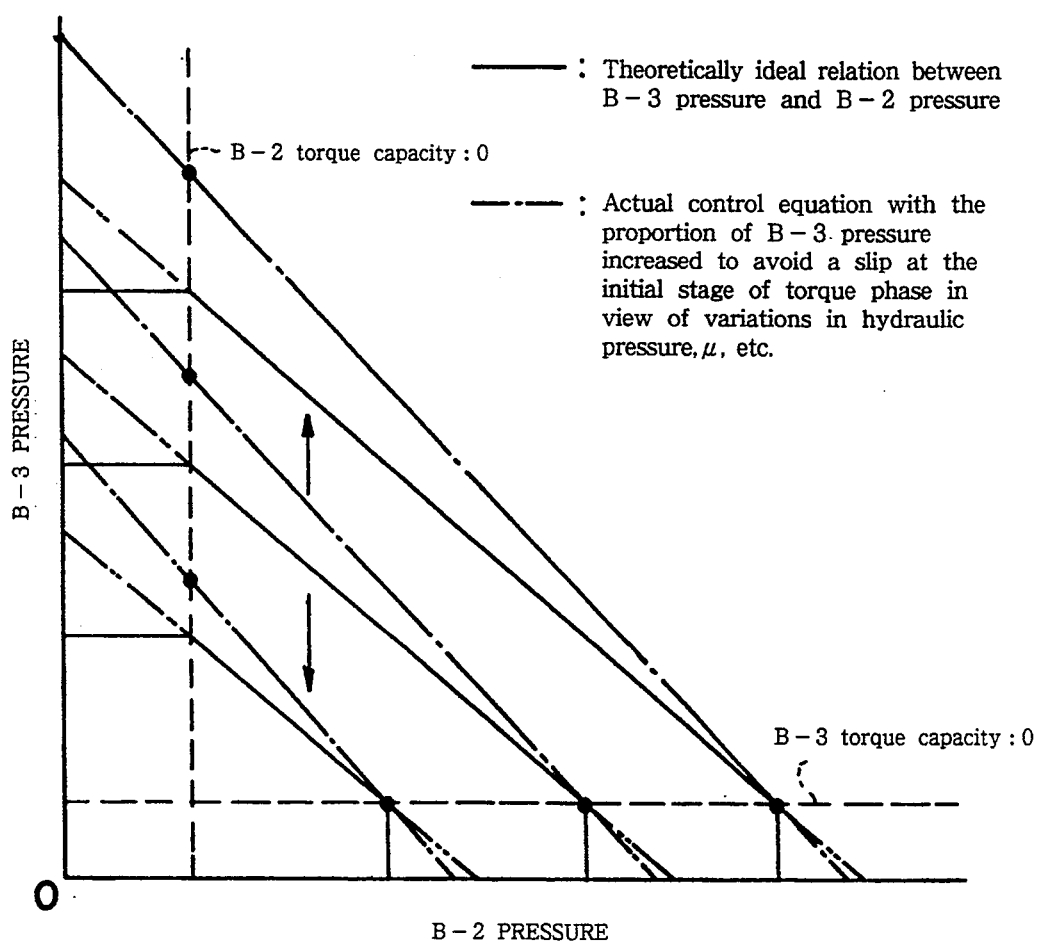
FIG. 2 is a characteristic diagram of servo pressure control according to the control method.

At this time, the servo hydraulic pressure (B-3 pressure) on the side of the frictional engagement element, which is to be released by using the servo hydraulic pressure (B-2 pressure) on the side of the frictional engagement element to be engaged, is linearly lowered from the initiation of the shift to at least the end of the torque phase as illustrated in FIG. 2 so that the B-3 pressure remains in conformity with an inversely proportional relationship between the engaging pressure and the drain pressure, said relationship being derived theoretically. In FIG. 2, the solid lines indicate the theoretical relationships of the B-3 pressure to the B-2 pressure as derived by calculation, whereas alternate long and short dash lines show the actual relationships obtained by slightly increasing the proportion of the B-3 pressure to avoid slip at the initial stage of the torque phase, in view of variations in flow resistance due to temperature variations and variations in the coefficients of friction of the frictional engagement elements.

If the throttle valve is operated during the above pressure-lowering control, a change in input torque, said change corresponding to the resulting change in the opening of the throttle valve, is detected by the input torque detector 7. Responsive to a detection signal from the input torque detector 7, a control signal is outputted from the ECU 6 to the SLU linear solenoid valve 3. As a result, the piston 2d is displaced in accordance with the resulting change in the signal pressure applied from the port 24 so that the spring load of the spring 2c is changed. Since the B-3 pressure is controlled according to the signal pressure at the port 24 such that the spring 2c is compressed and the 2-3 timing valve 2 and the piston 2d are connected together, the relationship is changed to that of the upper line or lower line by changes of the parameters shown in FIG. 2. When the power is on, for example, the B-3 pressure is increased by the application of the back pressure of the accumulator 4 and the brake is held in an overlapped state, so that the engine can be prevented from idling at a high speed. When the power is off, conversely, the spring load of the spring 2c is lowered, the B-3 pressure is lowered and the brake is hence held in an underlapped state, because there is no potential problem that the engine would idle at a high speed.

Figure 5:
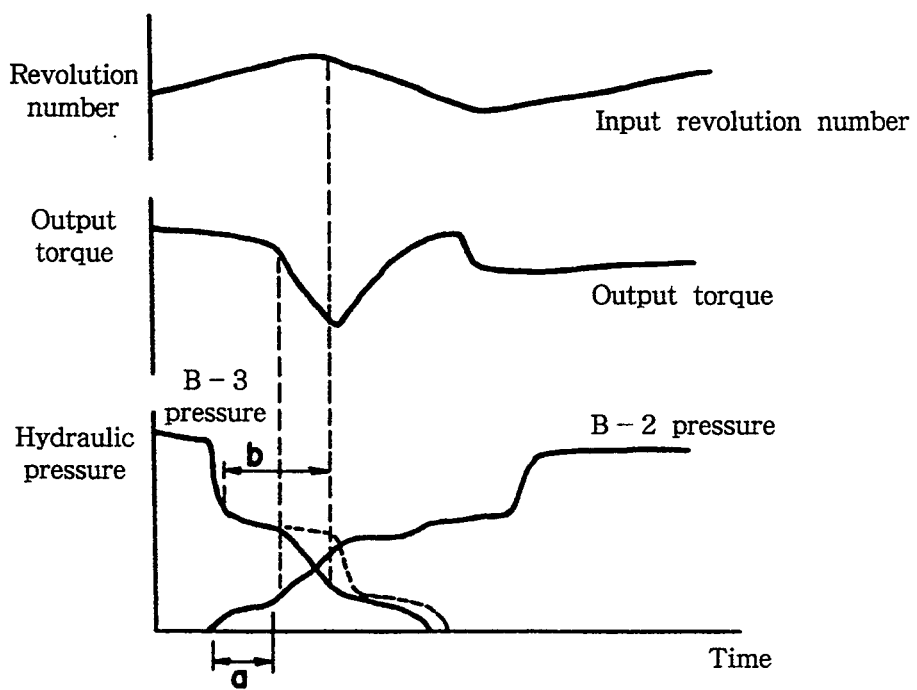
FIG. 5 is a shift characteristic diagram upon 2→3 shift of the automatic transmission.

FIG. 5 illustrates time-dependent variations of the actual B-2 pressure, B-3 pressure, output torque and input shaft rmp upon shifting. In the diagram, letter a indicates a fast-filling period, letter b designates a period of the pressure regulation according to the present invention, and the dashed curve shows a conventional drop in the drain pressure. The downward shift of the output torque curve at the end of the torque phase is attributed to a drop in torque due to tie-up of the brake.

A brief description will next be made of the reasons for which such an inversely proportional relationship exists between the B-2 pressure and the B-3 pressure. Based on static balancing of torques, the input torque $T_{IN}$, the B-2 transmission torque $T_{B2}$ and the B-3 transmission torque $T_{B3}$ during a shift are related as represented by the following equation:

$$T_{B3} \times (\lambda_1/1 + \lambda_2) + T_{B2} = \lambda_2 \times T_{IN} \qquad (1)$$

where, $\lambda_1: Z_{S1}/Z_{R1}$ $\lambda_2: Z_{S2}/Z_{R2}$ $Z_S$: the number of teeth of each sun gear $Z_R$: the number of teeth of each ring gear In the equation (1), $\lambda_1$ and $\lambda_2$ are constants defined by $Z_S$ and $Z_R$ so that the equation (1) is a first order equation of $T_{B2}$ with $T_{IN}$ serving as a parameter. By substituting specific data and frictional coefficients of the brakes for $T_{B3}$ and $T_{B2}$ in the equation, the equation can be converted to an equation which expresses the relationship between the B-3 pressure $P_{B3}$ and the B-2 pressure $P_{B2}$. The following equation is derived as a consequence:

$$T_{IN} = 9.822 P_{B3} - 6.601 + 17.19 P_{B2} - 9.788 \qquad (2)$$

The diagram shown in FIG. 2 is thus obtained.

As has been described above, the method according to this embodiment is designed in such a way that the releasing pressure can be regulated relative to increases in the engaging pressure in a predetermined relationship and the relationship between the engaging pressure and the releasing pressure can also be modified in accordance with variations in the input torque, namely, in accordance with solenoid pressures outputted from the linear solenoid valve 3. The linear solenoid valve 3 which controls the pressure regulation by the 2-3 timing valve 2 is independent from the control of the engaging pressure by the 2-3 shift valve 1 and can therefore be changed over regardless of the engaging characteristics. With respect to the relationship between the engaging pressure and releasing pressure, the 2-3 timing valve 2 is set so that, as indicated by the alternate long and short dash lines in FIG. 2, the safety factor of the clutch-releasing pressure is large near the starting point of the torque phase but becomes small near the end of the torque phase. This setting of the 2-3 timing valve 2 is effective in preventing high-speed idling of the engine in the initial stage of the torque phase and also in reducing variations of the change-over point.

According to the method of the above embodiment, the releasing pressure can be regulated relative to the engaging pressure by solenoid pressure which the linear solenoid valve 3 outputs in accordance with input torque. It is therefore always possible to appropriately control the brakes. Even when the accelerator pedal is released, good control is still feasible by underlapping the engaging pressure and the releasing pressure. Since the releasing pressure can be regulated based on the engaging pressure and the input torque, the releasing pressure can be corrected immediately, responsive to changes in temperature or variations in throttle opening in the course of shifting. Further, the timing of change-over can be corrected in view of variations in the coefficients of friction of the friction elements or time-dependent deteriorations in engine torque or the like by changing the solenoid pressure in accordance with such variations.

Figure 6:
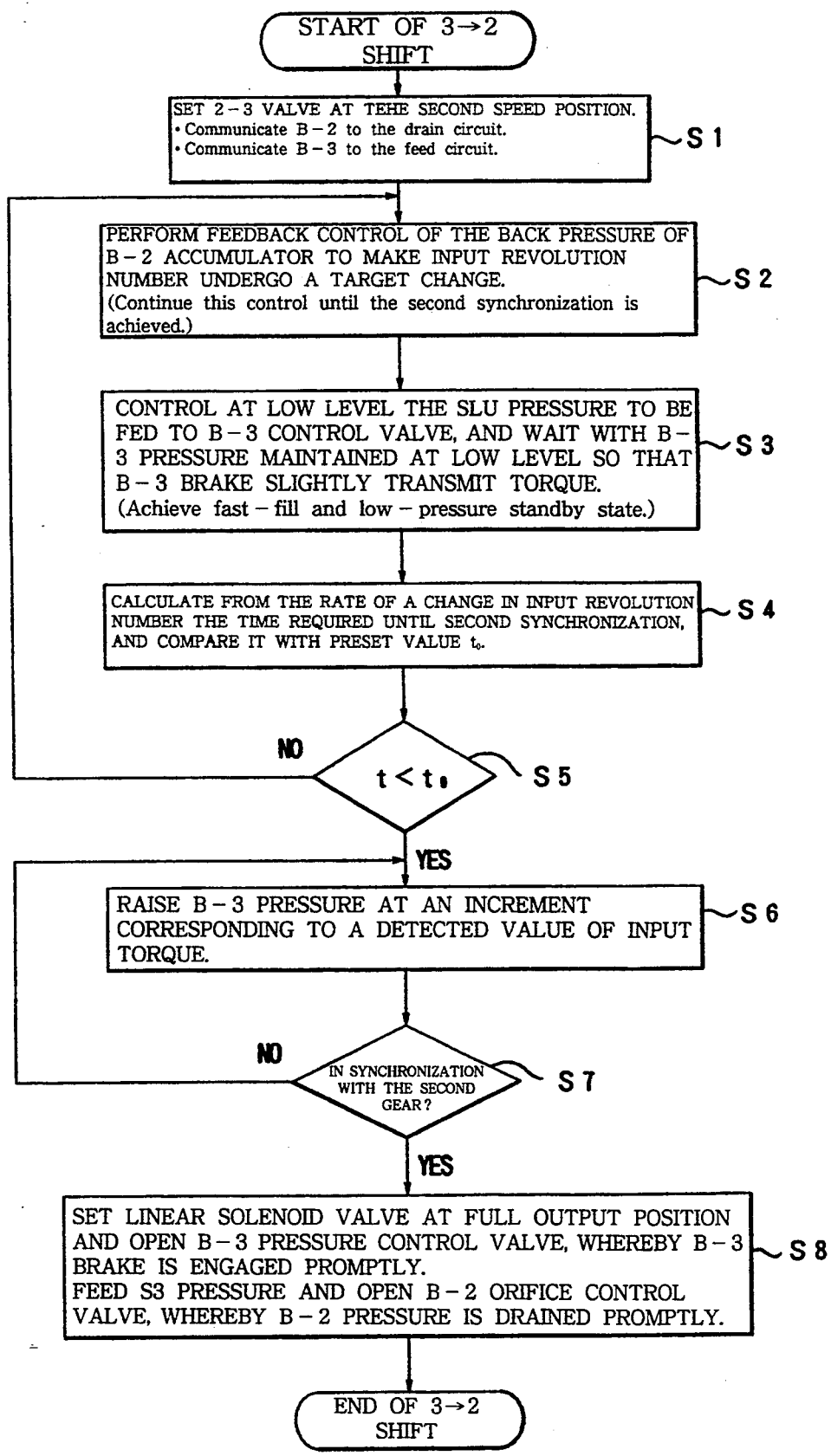
FIG. 6 is a flow chart of servo pressure control by the servo hydraulic pressure control method.

A description will next be made of 3→2 shift. The drive range pressure D is fed from the 2-3 shift valve 1 to the B-3 servo means via the feed/drain lines L1,L2. Feeding of pressure to the B-3 servo means is conducted by following the procedures of the flow chart shown in FIG. 6. The procedures will hereinafter be described based on FIG. 6. In step S1, under the control of a shifting solenoid valve (not shown), the 2-3 shift valve 1 brings the B-2 servo means into communicate with the drain circuit and also brings the B-3 servo means into communication with the feed circuit. Here, as is shown in step S2, the back pressure of the B-2 accumulator 8 is feedback-controlled as described above so that the input rpm undergoes a target change. This control is continued until a second synchronization is achieved.

During the above change in rpm, in other words, until the second synchronization is attained, the port 31 remains in communication with the port 32 because the spool 3c assumes the position which is shown in an upper half portion thereof in FIG. 1, by a spring of the B-3 control valve 10. Due to rapid supply of hydraulic pressure through the large-diameter orifice 3b, the piston of the B-3 servo means is immediately displaced to a position where the friction element can be engaged, in other words, fast filling is performed.

In step S3, the signal pressure to be fed to the port 34 of the B-3 control valve 10 is controlled at a low level by the SLU linear solenoid valve 3. The signal pressure is therefore maintained in a standby state where the feed pressure (hereinafter called "B-3 pressure") to the B-3 servo means is kept low to allow the B-3 brake to transmit a small amount of torque. This is the control to avoid influence to the above-described change in rpm. Omission of this control results in an abrupt change in rpm and tie-up of both the brakes, because of an increase in the B-3 pressure. Any extra portion of the B-3 pressure in this range is released through the B-2 orifice control valve 9 since the port 36 is opened as a result of application of feedback pressure from the port 33. By the operation described above, a low-pressure, standby state is achieved.

The routine next advances to step S4, where the time t until the second synchronization is calculated at the ECU 6 from the rate of change in the number of input revolutions and is compared with a preset value $t_0$. As long as t is not found to exceed $t_0$ as a result of the above comparison, the routine returns from step S5 to step S2 so that the flow from step S2 to step S4 is repeated.

As soon as the value of the time t becomes greater than the preset value $t_0$, the routine then advances to step S6 where the B-2 pressure is raised at a an incremental rate corresponding to the value of input torque detected by the input torque detector 7. By this gradual pressure increase, both the brakes B-2 and B-3 are positioned so that they jointly share the bearing of the torque, thereby making it possible to achieve a smooth change to the point of synchronization by variations in their torque shares. This state is continued until synchronization with the second gear is confirmed in the next step S7.

When the synchronization is eventually confirmed the SLU linear solenoid valve is set at a full output position in step S8 so that the port 31 of the B-3 control valve 10 is brought into an open state providing full communication with the port 32. As a result, the B-3 brake is promptly engaged. Responsive to a signal pressure fed from a solenoid valve, on the other hand, the B-2 orifice control valve 9 is opened so that the B-2 pressure is drained promptly. By the series of steps described above, the 3→2 shift is completed. In the manner described above, the engaging pressure is regulated stepwise in the system of the above embodiment until the synchronization with the second gear is attained.

The present invention has been described in detail based on one embodiment in which the present invention was applied to a five-speed automatic transmission. It is to be noted that apparatuses to which the present invention can be applied are not limited to such automatic transmissions. Further, the specific construction of each element is not limited to that described above. It is possible to adopt, for example, a design wherein that the engaging pressure is directly controlled, based on electrical signals alone, by using a solenoid valve, instead of the timing valve provided that high-accuracy, direct detection of the engaging pressure and releasing pressure is feasible.

We claim:
1. A control system for an automatic transmission having a planetary gear mechanism disposed between an input shaft and an output shaft and first and second frictional engagement elements for braking, respectively, first and second components of said planetary gear mechanism, said first frictional engagement element being released while said second frictional engagement element is engaged upon upshifting from a given speed stage to another speed stage, said control system comprising:
    a detector for detecting input torque at the input shaft;

a first hydraulic servo for engaging the first frictional engagement element;

a second hydraulic servo for engaging the second frictional engagement element;

a first hydraulic line connecting said first hydraulic servo with a drain port;

a second hydraulic line for feeding hydraulic pressure to said second hydraulic servo;

solenoid valve means for outputting a signal pressure responsive to the detected input torque; and timing valve means, in fluid communication with said first hydraulic line, for lowering servo hydraulic pressure of said first hydraulic servo in conformity with an inversely proportional relationship between servo hydraulic pressure to said first hydraulic servo and servo hydraulic pressure to said second hydraulic servo, said inversely proportional relationship being predetermined for said signal pressure.

2. A control system in accordance with claim 1 wherein said timing valve means comprises a valve spool having a first pressure-receiving face for receiving the servo hydraulic pressure of said first hydraulic servo to move said spool to a position for connecting said first hydraulic servo and said drain port, and a second pressure-receiving face for receiving the servo hydraulic pressure to said second hydraulic servo to move said spool toward a position for connecting said first hydraulic servo with said drain port and a third pressure-receiving face for receiving the signal pressure from said solenoid valve to move said spool toward a position where said first hydraulic servo is disconnected from said drain port.

3. The control system in accordance with claim 1 further comprising:

accumulator means, including an accumulator connected to said second hydraulic line, for gradually raising the servo hydraulic pressure to said second hydraulic servo; and an accumulator control solenoid valve for controlling back pressure of said accumulator.

4. A hydraulic control system in accordance with claim 2 wherein said spool means comprises first and second spools and a spring disposed between said first and second spools, said first spool carrying said first pressure-receiving face and said second pressure-receiving face and said second spool carrying said third pressure-receiving face.

5. A method for the control of servo hydraulic pressure in an automatic transmission having a planetary gear mechanism disposed between an input shaft and an output shaft and first and second frictional engagement elements, engageable, respectively, by a first hydraulic servo responsive to a first servo hydraulic pressure and by a second hydraulic servo responsive to a second servo hydraulic pressure, to upshift from one speed stage to another speed stage, said method comprising the steps of:

a) detecting input torque to the input shaft;

b) with the first frictional engagement element engaged and the second frictional engagement element disengaged, gradually raising the second servo hydraulic pressure to engage the second frictional engagement element; and c) simultaneously with step b, lowering the first servo hydraulic pressure to disengage the first frictional engagement element responsive to (1) the rise in the second servo hydraulic pressure and (2) the detected input torque, whereby the first servo hydraulic pressure is lowered in conformity with an inversely proportional relationship with the second servo hydraulic pressure, said inversely proportional relationship being predetermined for the detected input torque.

6. A method in accordance with claim 5 further comprising:

inputting a signal representative of the detected input torque into an electronic control unit;

generating, within said electronic control unit, a control signal responsive to said input torque signal, wherein said lowering of said first servo hydraulic pressure is controlled responsive to said control signal.

* * * * *

UNITED STATES PATENT AND TRADEMARK OFFICE
CERTIFICATE OF CORRECTION

PATENT NO. : 5,368,531
DATED : November 29, 1994
INVENTOR(S) : ANDO et al

It is certified that error appears in the above-indentified patent and that said Letters Patent is hereby corrected as shown below:

Col. 1, line 59, delete "an".

Col. 8, line 50, delete "that".

Signed and Sealed this

Tenth Day of October, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,368,531
DATED : November 29, 1994
INVENTOR(S) : ANDO et al

It is certified that error appears in the above-indentified patent and that said Letters Patent is hereby corrected as shown below:

On the title page, item [73] Assignee:

"Jidosha Kabushiki Kaisha Toyota" should read

--Toyota Jidosha Kabushiki Kaisha--.

Signed and Sealed this

Twenty-eighth Day of November 1995

Attest:

BRUCE LEHMAN

*Attesting Officer*     *Commissioner of Patents and Trademarks*